United States Patent Office

3,468,937
Patented Sept. 23, 1969

3,468,937
PROCESS FOR THE PREPARATION OF PURE CARNITINE IN BETAINE FORM
Erich Strack and Irmgard Lorenz, Leipzig, Germany, assignors to VEB Berlin-Chemie, Berlin-Adlershof, Germany
No Drawing. Filed July 13, 1965, Ser. No. 471,740
Int. Cl. C07c *101/04*
U.S. Cl. 260—501.13
4 Claims

ABSTRACT OF THE DISCLOSURE

A process for the preparation of pure carnitine in betaine form from the respective carnitine nitrile chloride in which the carnitine nitrile chloride is heated in alcoholic hydrochloric acid solution until formation of ammonium chloride stops, whereupon it is separated from the solution, and the remaining solution is evaporated to dryness, the residue is dissolved in water, the chlorine ions are eliminated from the solution by conventional methods, and the solution is evaporated to dryness under reduced pressure, whereby the pure carnitine betaine is obtained. The products obtained are useful for many purposes, e.g. improvement of protein utilization in the body, against indigestion, adjustment of metabolism, and the like.

---

The present invention relates to a process for the preparation of the betaine form of l(+)-, d(—)- and racemic dl-carnitine from the corresponding carnitine nitrile chlorides.

The carnitine betaine form is of high importance for medical purposes, because they are the only form, in which carnitine isomers, which are of increasing physiological and therapeutical value, can be directly applied by injection. The betaine form can be stearilized in aqueous solution without decomposition; it is non-toxic and stable in dry state.

It is known to isolate natural l(—)-carnitine from tissues and body liquids. However, the process is cumbersome and uneconomical, since parts of the body contain only small amounts of carnitine.

Racemic dl carnitine betaine has been produced synthetically from γ- amino- β- hydroxy butyric acid, but the yields were poor, not above 20–25%; furthermore, the final product was not pure.

According to known methods, the three optically isomeric carnitine betaines are obtained synthetically by boiling for 4 hours, the corresponding carnitine nitrile chloride in a solution of absolute ethanol, into which dry gaseous hydrochloric acid is introduced; the so obtained ester is freed from alcohol and saponified for 1–2 days with aqueous hydrochloric acid, and the carnitine chloride thus obtained is isolated, purified, and chlorine ions are eliminated therefrom.

This method is cumbersome and lengthy, and the yields in pure carnitine betaine are unsatisfactory due to the losses incurred during the several operational steps.

It is, therefore, the object of the present invention to provide a process for obtaining pure carnitine betaine in a simpler and more efficient manner.

Other objects and advantages of the present invention will become apparent from the following detailed description.

The objects can be achieved according to the invention in the following manner:

Carnitine nitrile chloride is heated for a short time in alcoholic hydrochloric acid, the ammonium chloride formed is separated, the remaining alcoholic hydrochloric acid solution is evaporated and the residue is dissolved in water. When from the aqueous solution the chlorine ions have been eliminated, for instance by an anion exchanger or by reaction with silver oxide, and the solution is evaporated to dryness, pure carnitine betaine will be obtained in almost quantitative yield. If a yet purer product is desired, the carnitine betaine may be recrystallized from alcohol or alcoholic solvent mixtures, no marked losses being incurred by this method.

For a careful handling of the substances involved, it is advisable to carry out the evaporation operations under reduced pressure.

If it is desired to receive at once a sterile product, it is possible to work under sterile conditions after the first evaporation.

The invention will be more fully explained in the following examples but it should be understood that these are given by way of illustration and not of limitation and that many modifications in the details can be made without departing from the spirit of the invention.

Example 1

71.4 g. l(—)-carnitine nitrile chloride were heated in 750 ml. methanolic hydrochloric acid, until ammonium chloride is no longer formed. This took about 120 minutes. The ammonium chloride was then separated from the solution, and the latter evaporated under reduced pressure. After having dissolved the residue in water, the chlorine ions were removed by addition of about 85 g. silver oxide and the remaining solution was evaporated to dryness under reduced pressure. What remains is 63 g. pure crystalline l(—)-carnitine in betaine form, 97.8% of the theoretical value. The color of the product was white, its taste pleasantly sweet. It was readily soluble in water and reacted almost neutral. $(\alpha)_D = -29.2°$;

$$Fp = 208-209° \text{ C.}$$

By recrystallization from ethanol we were able to obtain l(—)-carnitine betaine of highest purity $(\alpha)_D = -30.9°$, Fp=210–212° C.

Example 2

Instead of starting from the l(—)-form, we started from d(+)-carnitine nitrile chloride and proceeded as in Example 1. The product obtained was d(+)-carnitine betaine in equally high yield and of equally high purity as described with reference to the l(—)-product in Example 1. $(\alpha)_D = +30.9°$, $F_p = 210-212°$ C.

Example 3

When racemic dl-carnitine nitrile chloride was treated as described in Example 1, a racemic-product of equal purity and in equal yield was obtained. $F_p = 215°$ C., contains 1% water of crystallisation: Calc. 10.50%; found 10.07% $H_2O$. Calculated: C=52.15, H=9.38. Found: C=52.02, H=9.82 (anhydrous racemic carnitine betaine).

As mentioned before, the elimination of the chlorine ions can also be effected with the use of an anion exchanger, e.g. of the type of Wofatit L150. The carnitines are, as mentioned above, important compounds for a great variety of uses in medicine, e.g. for the removal of aneurexia, indigestion, disturbances of growth, for the improvement of protein utilization, and for the adjustment of metabolism, e.g. in thyrotoxicosis.

What we claim is:

1. A process for the preparation of pure carnitine in betaine form from the respective carnitine nitrile chloride which comprises heating said carnitine nitrile chloride in alcoholic hydrochloric acid solution until formation of ammonium chloride stops, separating the ammonium chloride formed from the solution, evaporating the remaining solution under reduced pressure to dryness, dissolving the ester residue in water, eliminating the chlorine ions from the solution by bringing the solution into contact with an anion exchanger, and evaporating the solution to dryness under reduced pressure, whereby the pure carnitine betaine is obtained.

2. The process as claimed in claim 1, wherein the carnitine nitrile chloride subjected to the process is l(+)-carnitine nitrile chloride and the product obtained is pure l(+)-carnitine betaine.

3. The process as claimed in claim 1, wherein the carnitine nitrile chloride subjected to the process is d(−)-carnitine nitrile chloride and the product obtained is pure d(−)-carnitine betaine.

4. The process as claimed in claim 1, wherein the carnitine nitrile chloride subjected to the process is racemic carnitine and the product obtained is pure racemic carnitine in betaine form.

References Cited

UNITED STATES PATENTS 2,129,264  9/1938  Downing et al.
3,135,788  6/1964  Noguchi et al.

FOREIGN PATENTS 912,019  12/1962  Great Britain.
9,464  7/1962  Japan.

OTHER REFERENCES

Calmon et al.: Ion Exchangers in Organic and Biochemistry, N.Y. (1957), p. 643.

Strack et al.: Ber. No. 86, pp. 525–29 (1953).

Carter et al.: J. Am. Chem. Soc., 75, pp. 2503–4 (1953).

BERNARD HELFIN, Primary Examiner

M. W. GLYNN, Assistant Examiner